United States Patent

Stanesic

[11] Patent Number: 5,435,617
[45] Date of Patent: Jul. 25, 1995

[54] REAR AIR DEFLECTOR FOR CARGO-STYLE DOOR VEHICLE

[75] Inventor: John M. Stanesic, Johnston, Iowa

[73] Assignee: DFM Corporation, Urbandale, Iowa

[21] Appl. No.: 212,004

[22] Filed: Mar. 11, 1994

Related U.S. Application Data

[60] Division of Ser. No. 103,187, Aug. 6, 1993, Pat. No. 5,338,088, which is a continuation-in-part of Ser. No. 912,325, Jul. 13, 1992, Pat. No. 5,249,836, which is a continuation-in-part of Ser. No. 744,230, Aug. 13, 1991, abandoned.

[51] Int. Cl.⁶ .............................. B60J 1/20
[52] U.S. Cl. ..................... 296/180.1; 296/91
[58] Field of Search ..................... 296/91, 180.1

[56] References Cited

U.S. PATENT DOCUMENTS

| | | | |
|---|---|---|---|
| D. 204,932 | 5/1966 | Bott | D12/181 |
| D. 206,872 | 2/1967 | Borick | D12/181 |
| D. 212,531 | 10/1968 | Stephen | D12/181 |
| D. 291,978 | 9/1987 | Parr | D12/181 |
| D. 305,017 | 12/1989 | Lund | D12/181 |
| D. 306,849 | 3/1990 | Envall | D12/181 |
| 2,933,344 | 4/1960 | Shumaker | 296/91 |
| 3,072,431 | 1/1963 | Shumaker | 296/1 |
| 3,090,645 | 5/1963 | Shumaker | 296/91 |
| 3,097,882 | 7/1963 | Andrews | 296/91 |
| 3,427,067 | 2/1969 | Kish | 296/1 |
| 3,596,975 | 8/1971 | Stephen | 296/180.1 |
| 3,785,699 | 1/1974 | Molaskey | 296/152 |
| 3,799,603 | 3/1974 | Bott | 296/91 X |
| 3,856,193 | 12/1974 | Bott | 224/42.1 D |
| 3,930,432 | 1/1976 | Puchy | 85/53 |
| 4,040,656 | 8/1977 | Clenet | 296/91 |
| 4,339,145 | 7/1982 | Bott et al. | 296/91 X |
| 4,726,618 | 2/1988 | Hansen | 296/91 |
| 4,842,319 | 6/1989 | Ziegler | 296/91 |
| 4,881,772 | 11/1989 | Feinberg | 296/91 X |
| 5,171,057 | 12/1992 | Sharp | 296/91 |
| 5,249,836 | 10/1993 | Stanesie et al. | 296/180.1 |
| 5,253,829 | 10/1993 | Willey | 296/91 |

FOREIGN PATENT DOCUMENTS

| | | | |
|---|---|---|---|
| 58350 | 7/1987 | Canada . | |
| 1289167 | 9/1991 | Canada . | |
| 2501708 | 9/1982 | France | 296/91 |
| 3150746 | 6/1983 | Germany | 296/91 |

Primary Examiner—Joseph Pape
Attorney, Agent, or Firm—Zarley, McKee, Thomte, Voorhees & Sease

[57] ABSTRACT

A rear air deflector is provided for vans, trucks, and sport utility vehicles having cargo doors which open side to side, and windows in the cargo doors. The deflector includes a pair of mirror image shield portions having outer ends which are secured to the window frame of the cargo doors with a bracket extending around the edge of the window. The inner ends of each shield portion are secured to the window frame with a station having a bracket extending over the top edge of the window for securement into the window frame. In an alternative embodiment, a unitary shield for use on vehicles having a swing-up rear door utilizes a single station pressfit with adhesive to the door window at the midpoint of the deflector, and mounting brackets at each end which wrap around the edge of the window for securement into the window frame.

5 Claims, 5 Drawing Sheets

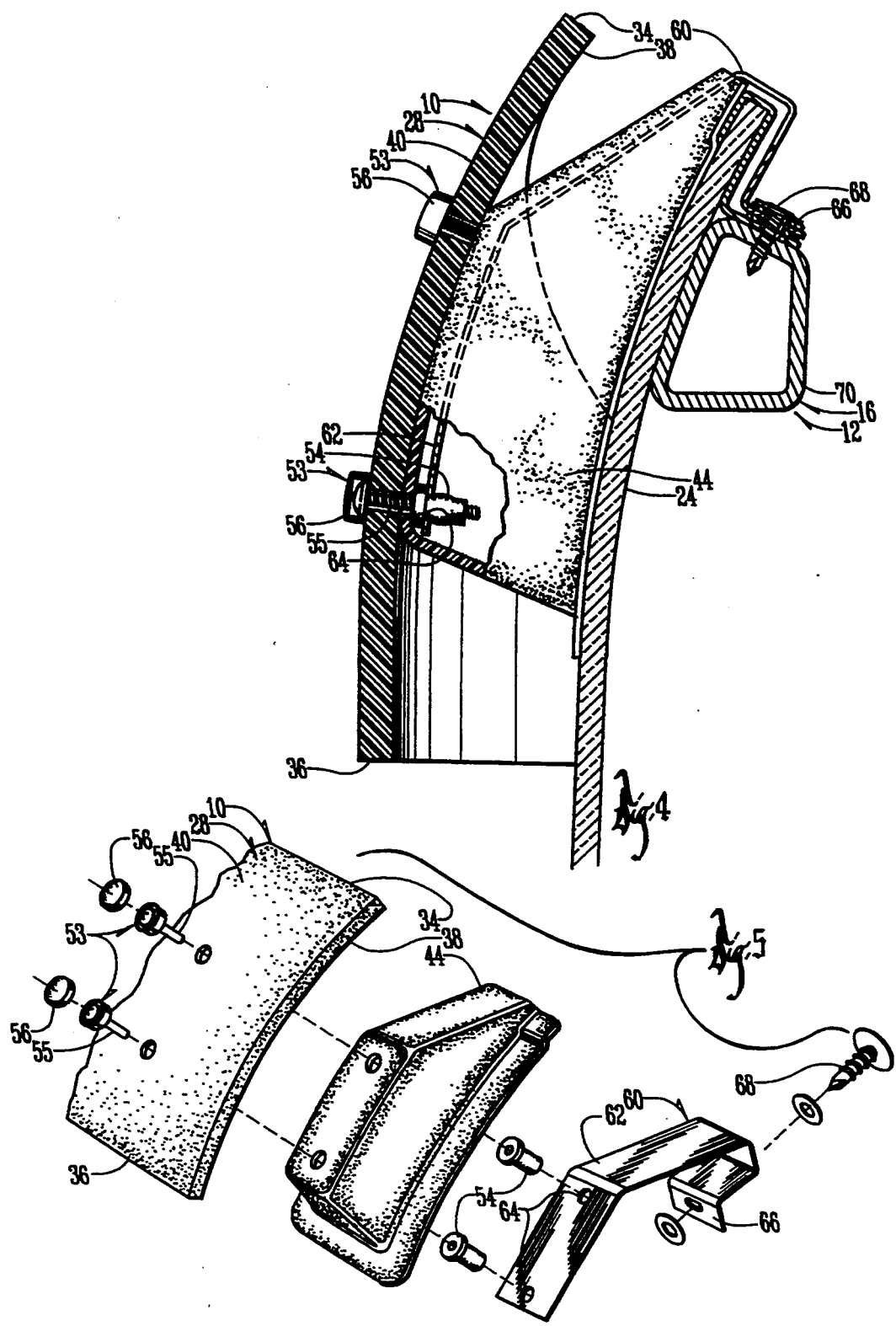

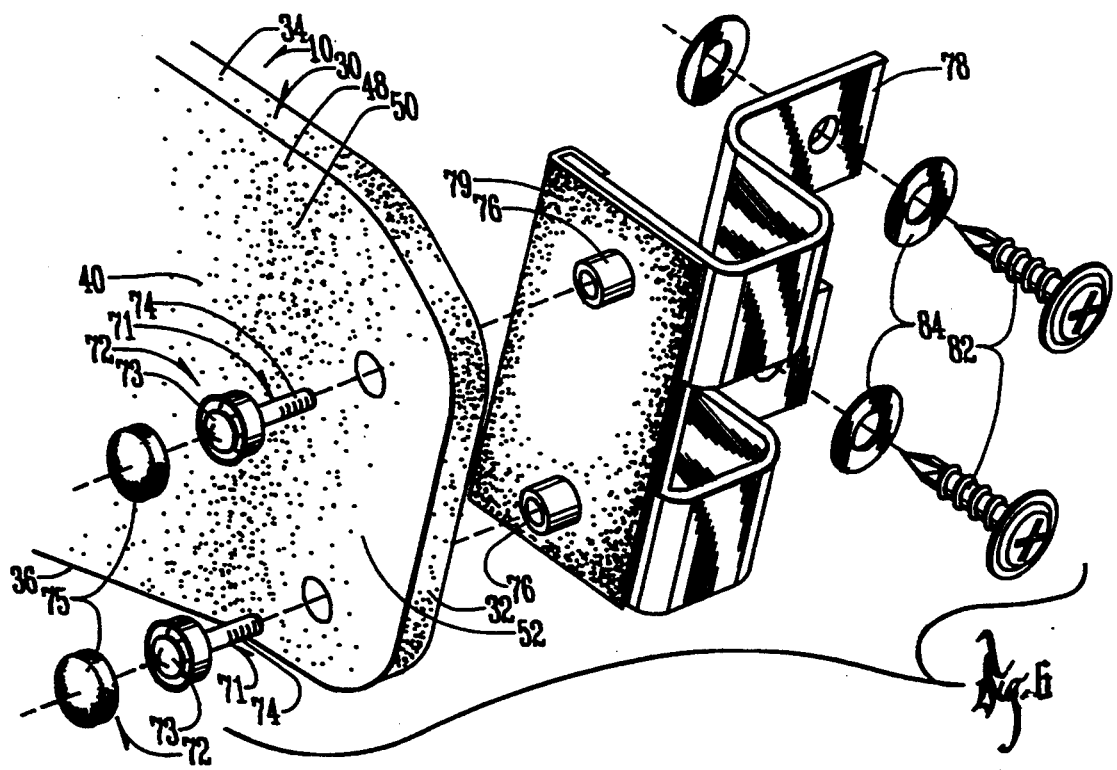
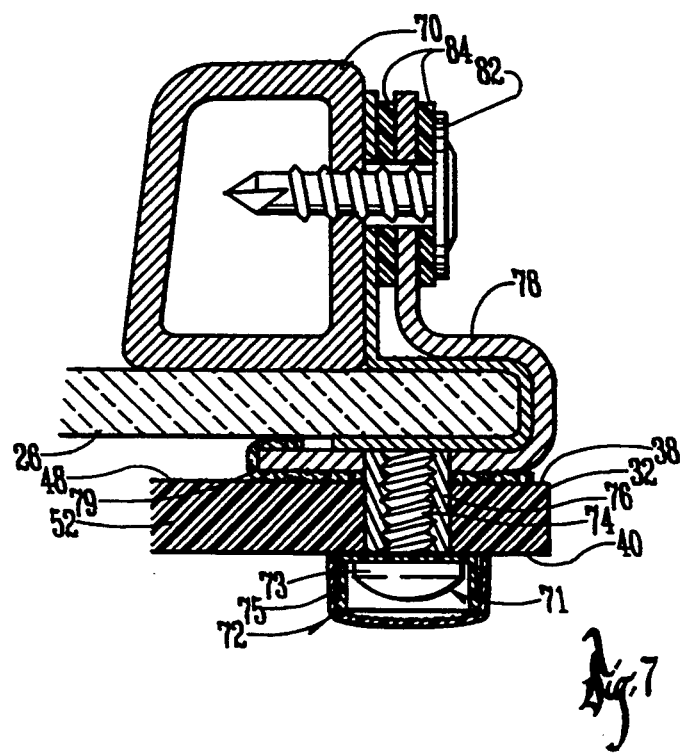

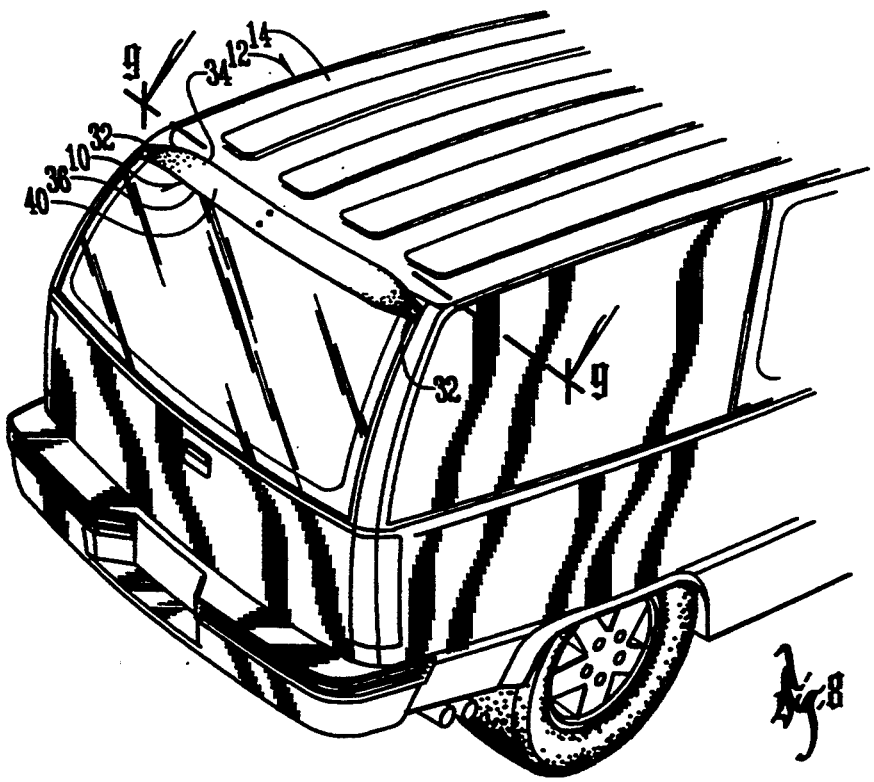
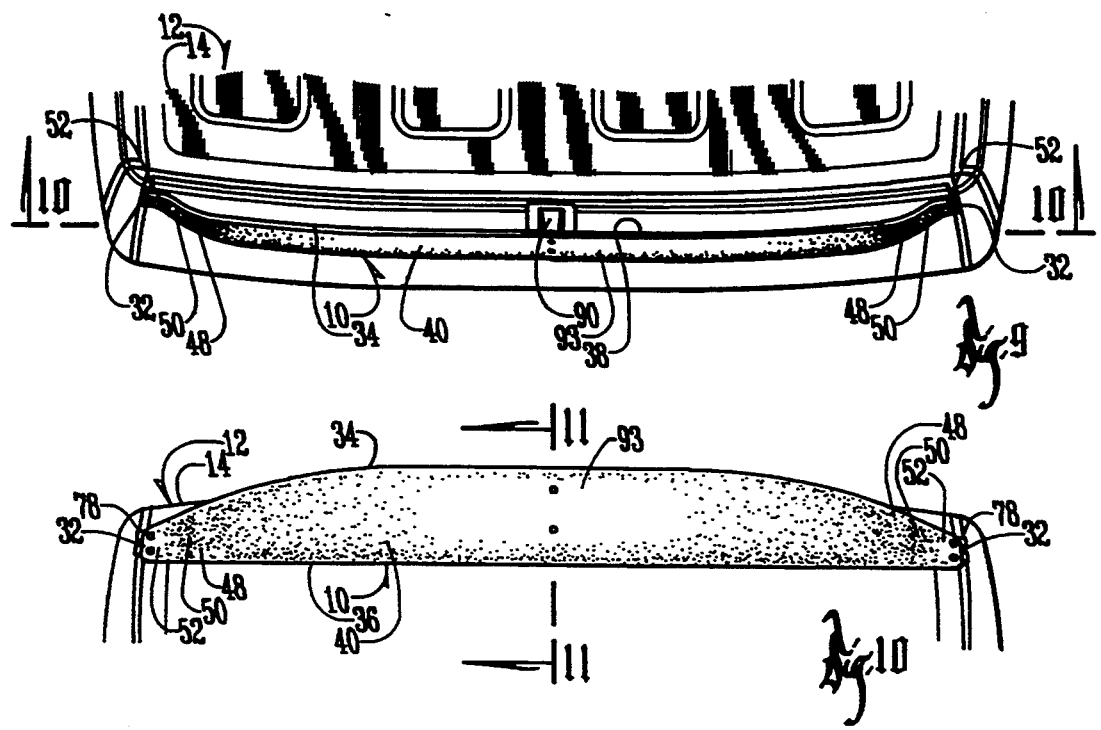

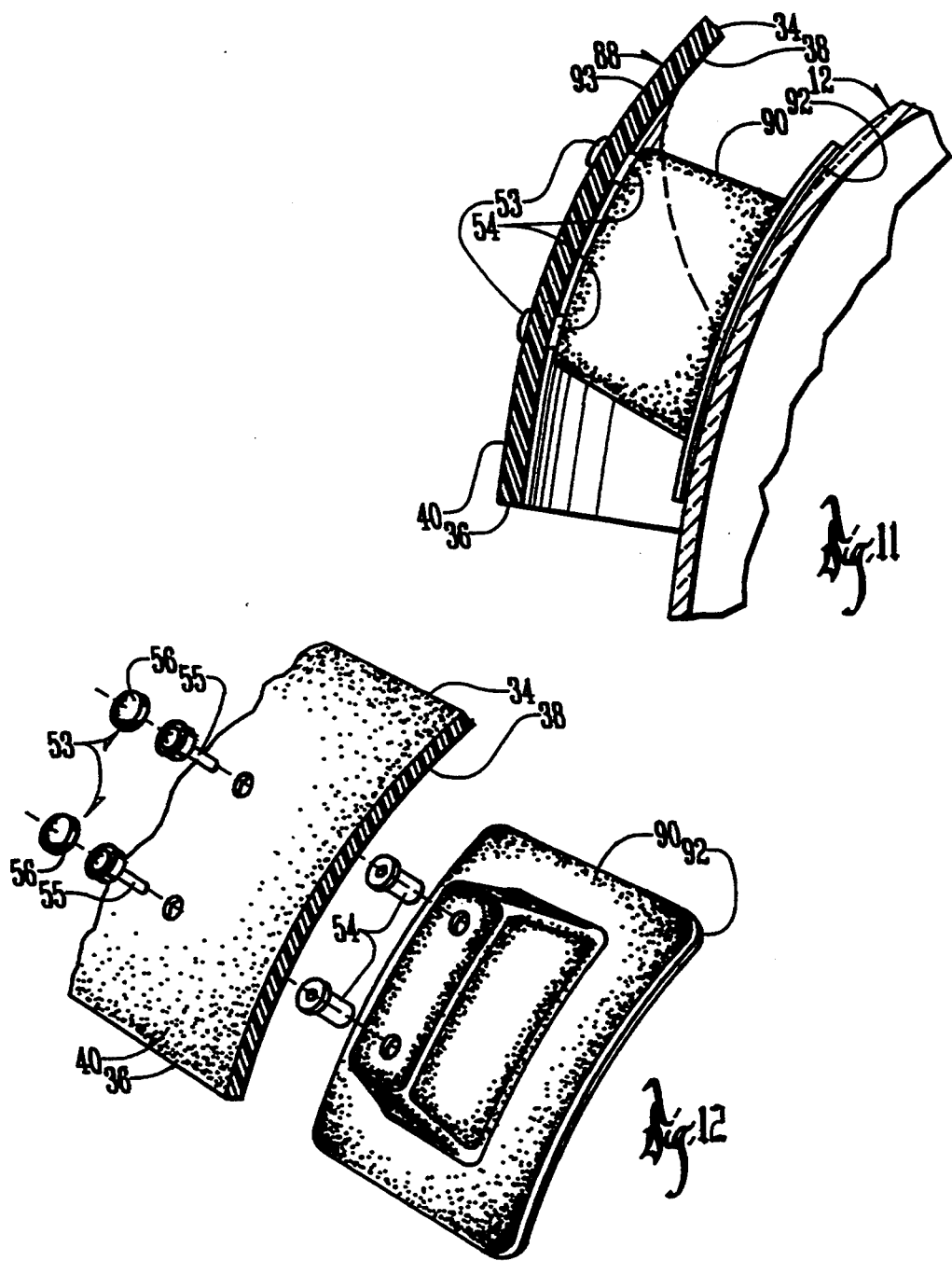

REAR AIR DEFLECTOR FOR CARGO-STYLE DOOR VEHICLE

CROSS REFERENCE TO RELATED APPLICATIONS

This application is a divisional of application Ser. No. 08/103,187 filed on Aug. 6, 1993 now U.S. Pat. No. 5,338,088 which is itself a continuation in part of commonly assigned application Ser. No. 912,325 filed Jul. 13, 1992 and entitled "Rear Air Deflector Shield" now U.S. Pat. No. 5,249,836, which itself is a continuation-in-part of application Ser. No. 07/744,230 filed Aug. 13, 1991, now abandoned.

BACKGROUND OF THE INVENTION

Rear air deflectors have been used for many years on motor vehicles such as station wagons, vans and trucks that have a substantially vertical rear window. They are used to prevent dust and debris from accumulating on the window. Conventional rear air deflectors are mounted above the rear window using mounting brackets such that the upper edge of the deflector resides above the roof line of the vehicle. Air is deflected by the deflector downwardly over the rear window when the vehicle is moving forwardly so as to keep the window free from dust and the like.

Rear air deflectors have become particularly useful and desirable for sport utility vehicles, station wagons, and other vehicles having an elongated cargo area that necessitates some sort of shield to keep the rear windows clear of dirt, snow, slush and highway road film.

A co-pending, commonly assigned application of Stanesic, et al. entitled REAR AIR DEFLECTOR SHIELD, filed Jul. 13, 1992, Ser. No. 07/912,325 relates to a rear air deflector of improved configuration which is aerodynamically shaped to provide a shield that is aesthetically pleasing and also a deflector which enhances airflow downwardly over the rear window when the vehicle is moving forwardly so as to keep the window free from dust, debris, etc. The deflector of that present application is of unitary construction. This is quite satisfactory for vans and sport utility vehicles that have only a single rear door. However, for vans, sport utility vehicles, etc. that have cargo doors which pivot about substantial vertical axes so as to open toward each side of the vehicle, such a unitary construction as that shown in the above-referred to parent application is not satisfactory. It is not satisfactory because the unitary construction rear deflector would hinder opening the doors along the center line. Thus, for vehicles having rear cargo doors with a split door design, the deflector design of the parent application is unsatisfactory.

As is apparent regardless of whether the van has split cargo style rear doors or a single rear door, there still is a need for keeping the rear window free from dust, debris, snow, rain, etc. This invention involves a cargo door style deflector, as well as a deflector of unitary style useful for sport utility vehicles that have rear windows or doors that pivot about a vertical axis to an open position. As seen, there is a real need for a rear air deflector that can be used with vehicles that have cargo style doors; and also there is a need for a mounting system for vehicles that use rear open, swing-up windows or doors.

A primary objective of the present invention is to provide an improved rear air deflector having aerodynamic characteristics and which can be used with vehicles having split cargo style rear doors.

Another objective of the present invention is to provide a rear air deflector in two parts such that one part can be mounted on each rear cargo door in a manner that does not interfere with opening and closing of the rear cargo doors of a vehicle.

Still another objective of the present invention is to provide a rear air deflector with a bracket attachment design which allows mounting to the edge of the door frame and having an associated stanchion or mounting pedestal which is mounted by pressure adhesive to the glass.

Another objective of the present invention is to provide a rear air deflector which is economical to manufacture, is composed of two parts to allow use with cargo style doors, which is easy to mount, does not interfere with opening and closing of the cargo doors, and which duplicates the aerodynamic and aesthetic characteristics of the unitary rear air deflector of my parent application.

A yet further objective is to provide an alternate embodiment unitary shield for mounting and use with utility vehicles having a swing-up rear window or door, that allows for high mounting that does not interfere with the window or door.

The method and means for accomplishing these and other objectives will become apparent from the detailed description of the invention which follows hereafter.

SUMMARY OF THE INVENTION

A rear air deflector of two-part construction that comprises a first elongated shield portion having opposite ends and a second elongated shield portion having opposite ends with the outer end portions of the deflector having a reverse curve profile. The deflector is mounted in spaced apart relationship from the rear window frame of the doors of a cargo style rear door vehicle, substantially along the vehicle's length with the outer end portions curved so as to be substantially parallel with the window frame. The inner end of each of the two shield portions are mounted to a stanchion or pedestal that is mounted to the window frame. In this manner the two halves are each securely mounted to one of the rear cargo doors such that the doors may be opened and closed individually without the rear deflector interfering. The end portions of the shield are secured directly to the frame. In an alternate embodiment, a unitary shield is stanchion mounted so as to not interfere with swing-up doors and windows.

BRIEF DESCRIPTION OF THE DRAWINGS

FIG. 4 is a sectional view showing one of the single stanchion mounts taken along line 4—4 of FIG. 3.

FIG. 5 is an exploded view of the stanchion used with the two piece deflector,

FIG. 6 is an exploded view of the bracket assembly used at the end 2 of the deflector.

FIG. 7 is an enlarged sectional view taken along line 7—7 of FIG. 3.

FIG. 8 shows a perspective view of the rear of a sport utility vehicle that has a swing-up rear door with a unitary deflector.

FIG. 9 is a top plan view taken along line 9—9 of FIG. 8.

FIG. 10 is an end view taken along line 10—10 of FIG. 9.

FIG. 11 is an enlarged sectional view of the stanchion fastening assembly taken along lines 11—11 of FIG. 10.

FIG. 12 is an enlarged exploded perspective view of the stanchion fastening assembly used to mount the unitary shield at its center to the vehicle.

DETAILED DESCRIPTION OF THE INVENTION

Figure 1:
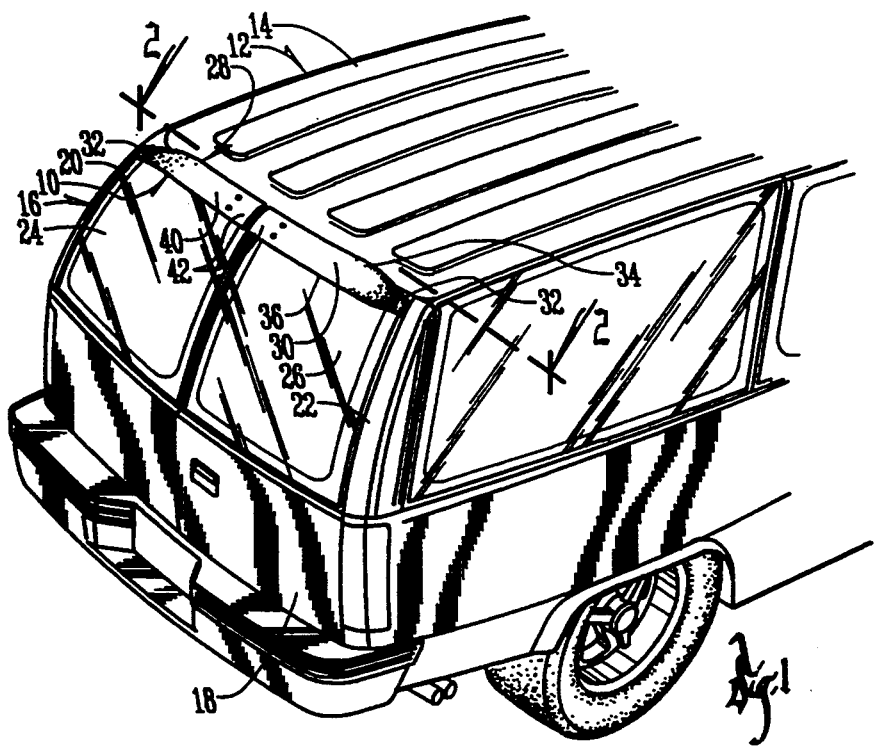
FIG. 1 is a perspective view of the rear end of van or mini-van having the two-part rear air deflector of the present invention mounted thereon.

The two part rear air deflector of the present invention is generally designated by the reference numeral 10 in the drawings. The deflector assembly 10 is designed for use on a vehicle 12, such as a van, mini-van, truck, station wagon or sport utility vehicle having a substantially square rearward end defined by a roof 14 and a pair of rear cargo doors 16, 18 each having an associated window frame 20, 22 surrounding substantially vertical rear windows 24, 26.

Figure 2:
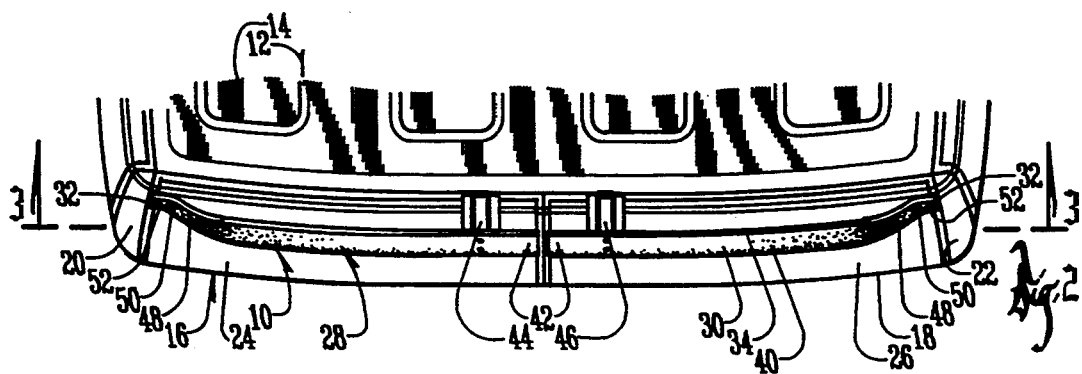
FIG. 2 is a top plan view taken along line 2—2 of FIG. 1.
Figure 3:
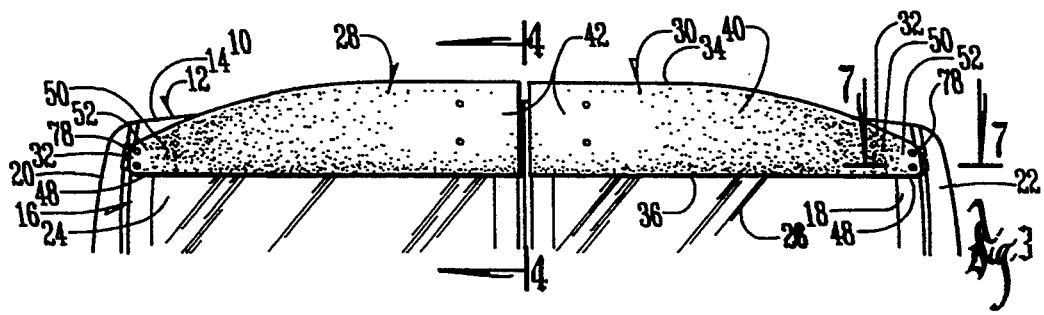
FIG. 3 is an end view along line 3—3 of FIG. 2.

The two part rear air deflector 10 is comprised of two shield portions 28 and 30. The shield portions 28 and 30 have opposite terminal ends 32, opposite upper and lower edges 34 and 36, respectively, and opposite forward and rear surfaces 38 and 40, respectively. In addition, shield portions 28 and 30 have inner ends 42 which are mounted to stanchions 44 and 46 as illustrated in FIGS. 2, 4 and 5. The stanchions are mounted near the upper top portion of rear windows 24 and 26.

As best seen in FIG. 4, the deflector is concave between the top and bottom edges 34 and 36 substantially along the length of the shield. The two shield portions 28 and 30 taken together form a composite shield structure when the rear cargo doors 16 and 18 are closed. The shield portions are mirror images of one another and easily pass each other without interference as the doors swing open. The ends 48 of the deflector adjacent to terminal ends 32 have a reverse curve profile including an inner concave section 50 curved forwardly from the main body of the deflector and an outer convex or flattened portion 52 extending to the terminal ends 32 as best seen in FIGS. 2 and 6. This reverse curve profile allows the outer surface 40 to be substantially parallel with the window frames 22 and 24 so that the deflector 10 matingly engages the frame adjacent to the opposite ends 48. The terminal ends 32 are substantially perpendicular to the surface of the window frame. Concavity of the shield between its top and bottom edges is eliminated at adjacent the ends 48 so that the ends present a substantially flattened surface for engaging the frame 20 and 22.

A stanchion 44, 46 is mounted at the inner ends 42 of each shield portion 28 and 30. As best illustrated in FIGS. 4 and 5, stanchions 44 and 46 have hollow interior for insertion of a bracket 60. Bracket 60 has a stanchion insert member 62 with apertures 64 and a frame mount portion 66. The shield portions 28 and 30 are mounted to a respective stanchion 44 or 46 and bracket 60 as illustrated via fasteners 53, which include an expandable anchors 54, bolts 55 and head covers 56. Fasteners 53 are commercially available from Pop Fasteners of Shelton, Conn. under the trademark "WELL-NUT". Screw fasteners 68 are used to mount the bracket end 66 to the top edge of the window frame 70, as illustrated in FIG. 4.

The details of mounting the outer ends 48 of the shield portions 28 and 30 are best illustrated in FIGS. 6 and 7. At the outer ends 48, shield portions 28 and 30 are mounted directly to the window frame 22 and 24 for each of the cargo doors 16 and 18 using a plurality of fasteners 72. Each fastener 72 includes a bolt 71 having a head 73 and a shaft 74, and a threaded nut 76, as best seen in FIG. 6. Nut 76 is pressed into a metal bracket 78, having a protective cushion 79 made of rubber or the like, as seen in FIG. 6. A cover 75 is provided for enclosing the head 73 of bolt 71. Such covers are commercially available and described in U.S. Pat. No. 3,930,432 from Prodeck Products Inc. in Stratford, Tex. under the trademark "SNAPCAPS".

As illustrated in FIGS. 6 and 7 the outer ends 48 of shield portions 28 and 30 are mounted using brackets 78 to the window frame 20 and 22 of each cargo door 16 and 18. Brackets 78 are mounted by screw fasteners 82 and associated gasket washers 84 to the door frame as illustrated in FIG. 7 so that the shield portions 28 and 30 are secured to the frame at their outer ends 48.

For the unitary deflector 88 shown in FIGS. 8-12, a single stanchion 90 is used. Pressure sensitive adhesive 92 mounts the stanchion 90 to the upper portion of glasses 24 and 26 of rear cargo doors 20 and 22. Such pressure sensitive adhesives are well known and commonly available in the automotive accessive industry and used for attaching moldings, etc. Suppliers for example include 3M of St. Paul, Minn. Conventional self-clenching Wellnut (TM) fasteners 53 having a bolt 52, an expandable anchor 54 and a nut cover 56 are used to mount the central portion 93 of the unitary deflector 88 to stanchion 90. The opposite ends 94 of the deflector 88 are mounted to the frame with brackets 78, as described above for the two piece deflector.

In the installation process, brackets 78 are first positioned at the correct vertical location to the door frame. Shield portions 28 and 30 are then aligned for the correct position of stanchions 44, 46. Stanchions 44, 46 are then fit to the frame with brackets 60 for the desired level location. Thereafter the outer ends 48 are mounted using brackets 78 as previously described (FIG. 6). After mounting, the cargo doors 16 and 18 can be conveniently opened and closed without the deflector interfering with the use of the cargo doors. On the road the unit operates to deflect air in the same manner as a unitary structure rear deflector.

In the swing-up rear window system using the unitary shield 88, a single station 90 is mounted to the window using adhesive 92, as illustrated in FIGS. 11 and 12, and the outer ends 94 are mounted with brackets 78, as earlier described for FIGS. 6 and 7. Because of the mounting system the unit does not interfere with the swing-up rear window or door.

It therefore can be seen that the invention accomplishes at least all of its stated objectives.

What is claimed:

1. A rear deflector for vehicles such as automobiles, vans and trucks, having a roof, a rear window, and a window frame having a top, bottom and side portions extending around the window, the deflector comprising:

an elongated shield portion having opposite outer ends, opposite upper and lower edges and opposite forward and rearward surfaces;

the shield portion having a reverse curve profile adjacent each outer end such that the forward surface of the shield adjacent each outer end is substantially parallel to the window frame so as to provide mating engagement between the forward surface of the shield portion adjacent to the shield ends and the window frame;

a fastening stanchion positioned midway between the outer ends of said elongated shield portion for attachment of said elongated shield portion directly to a top part of the window frame of said rear window of said vehicle;

fastening means extending through the shield portion and into the stanchion for securing the shield portion to the top portion of the window frame; and a mounting bracket assembly extending through the shield portion and adjacently around an edge of the rear window and into the window frame for securing each of the outer ends of the shield portion to the window frame.

2. The deflector of claim 1 wherein the fastening stanchion is adhesive pressfit into position.

3. The deflector of claim 1 wherein the fastening stanchion is a pressfit adhesive mount stanchion.

4. The deflector of claim 1 wherein the mounting bracket assembly comprises a mounting bracket having one end secured by a fastener to the shield portion adjacent the outer end of the shield portion and having a central portion adapted to receive an edge of the rear window and having a second end secured by a screw to the window frame.

5. The deflector of claim 1 wherein the central portion of the mounting bracket has a vertically disposed groove for receiving an edge of the rear window and the second end is secured by a screw to the side portion of the window frame.

* * * * *